No. 668,979. Patented Feb. 26, 1901.
A. G. CARLSON.
CONTROLLING DEVICE FOR ELECTRIC MOTORS.
(Application filed May 19, 1899.)
(No Model.)
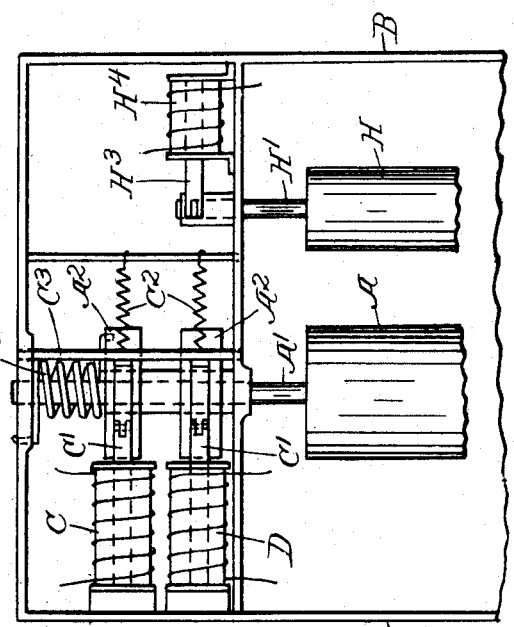
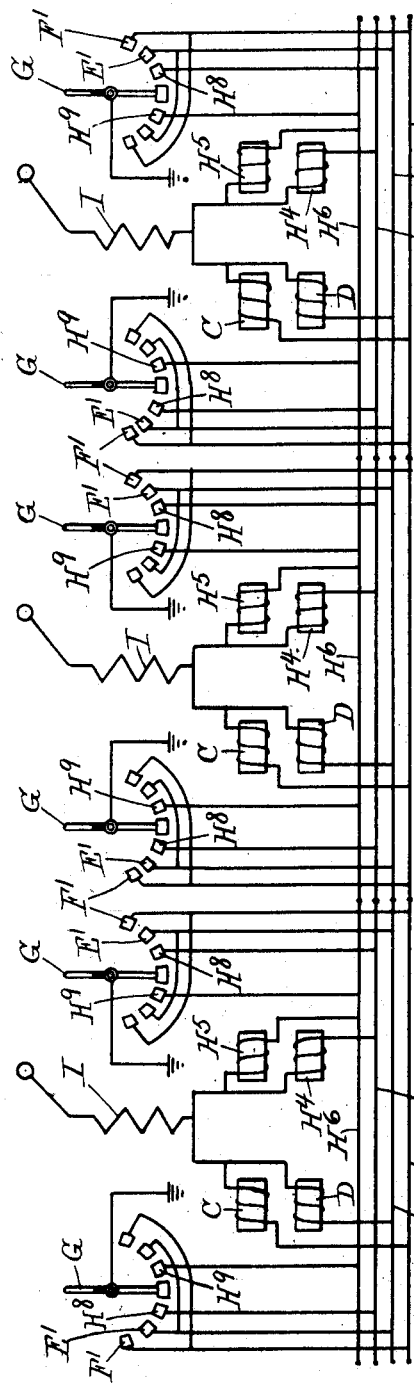
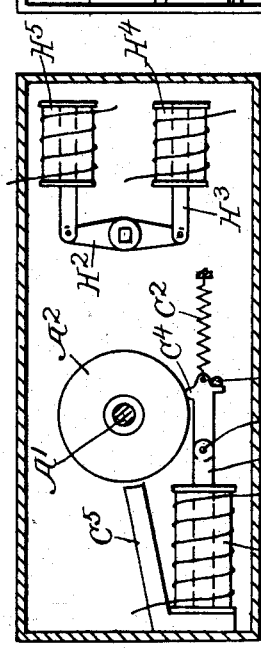
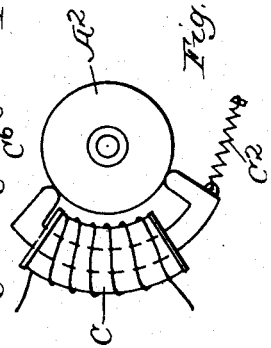
Witnesses
Edward T. Wray.
Donald M. Carter.
Inventor
Adolph G. Carlson
THE NORRIS PETERS CO., PHOTO-LITHO., WASHINGTON, D. C.

UNITED STATES PATENT OFFICE.

ADOLPH G. CARLSON, OF CHICAGO, ILLINOIS.

CONTROLLING DEVICE FOR ELECTRIC MOTORS.

SPECIFICATION forming part of Letters Patent No. 668,979, dated February 26, 1901.

Application filed May 19, 1899. Serial No. 717,399. (No model.)

*To all whom it may concern:*

Be it known that I, ADOLPH G. CARLSON, a citizen of the United States, residing at Chicago, in the county of Cook and State of Illinois, have invented a certain new and useful Improvement in Controlling Devices for Electric Motors, of which the following is a specification.

My invention relates to controlling devices for motors, and has for its object to provide a new and improved device for this purpose.

My invention is illustrated in the accompanying drawings, wherein—

Figure 1 is a side view of a device embodying my invention, a portion of the casing being removed. Fig. 2 is a plan view of Fig. 1 with the upper part of the casing removed. Fig. 3 is a diagrammatic view showing the circuit connections of several cars with my invention applied thereto. Fig. 4 is a view showing a modified construction.

Like letters refer to like parts throughout the several figures.

My invention is applicable to controlling devices of various descriptions, and I have illustrated it in connection with an ordinary controlling device for electric street-car motors. These controlling devices are ordinarily operated by means of a shaft and a controlling-handle for controlling the current admitted to the motor. If the controlling-handle is moved at too rapid a rate, the current is admitted to the motor too rapidly and many evil results are produced, such as injury to the motor and waste of current. One of the objects of my invention is to so operate this controller as to prevent the too-rapid admission of the current to the motors.

Referring to Figs. 1 and 2, I have shown an ordinary street-car-motor controller A, inclosed in a suitable casing B. I have not shown the construction of the controller, as such construction is no part of my present invention and may be varied at will. Associated with the movable part or shaft A' of the controller is one or more electromagnetic devices. These electromagnetic devices may be constructed in any desired manner, and, as herein shown, they consist of the solenoids C and D, provided with suitable cores C', normally held in an operative position by the retracting-springs C². Opposed to the cores C' and attached to the shaft A', by which the controller is operated, is a piece of magnetic material A². When two or more solenoids are used, this piece of magnetic material is preferably divided into two or more parts magnetically insulated from each other in any desired manner. A suitable stop C³ is provided for each of the cores, so as to limit their outward movement. Said cores are adapted to engage the piece of magnetic material opposed thereto and may be provided with the projections C⁴ for this purpose, although these projections are not essential to obtain the desired results. One pole C⁵ of each of the solenoids is extended, so as to be in proximity to the magnetic material A², so that the magnetic circuit will be completed through this pole, the piece A², and the core. The solenoids are connected by conductors E and F with contacts E' F', associated with the controlling-arm G, located at some convenient part on the car, by the manipulation of which the device is operated. The cores C' are constructed so that they may easily engage the opposed magnetic material during all of their various positions. This result may be attained in any desired manner—as, for example, by pivotally connecting the engaging pieces of the cores with the remaining parts, as shown at C⁶. Associated with the shaft A' is a retracting-spring A³, which moves the controller to its initial position when the current ceases to flow through either of the solenoids C and D. Associated with the controller is an ordinary reversing device H, operated by rotating the shaft H'. Connected with this shaft is an arm H², the ends of which are connected to the cores H³ of the solenoids H⁴ H⁵. These solenoids are connected with conductors H⁶ H⁷, which in turn are connected with contacts H⁸ H⁹, associated with the controlling-arm G. It will be seen that when the current is passed through one of the solenoids the arm H² will be moved in one direction and when the current is passed through the other solenoid the arm will be moved in the opposite direction. The controller is so arranged that when in one of these positions the motors drive the car in one direction and when in the other position the motors drive the car in the other direction.

When several cars are formed into a train, the circuits are connected together, as shown in Fig. 3, so that the devices on all the cars will be simultaneously operated by operating the controlling-arm on either end of either of the cars.

As at present constructed the controllers are placed on the platform and occupy the space which might otherwise be occupied by a passenger. When my construction is used, the controller proper and associated mechanism may be placed in any position—as, for example, beneath the seat in the car, and hence will be out of the way—while the controlling-handle G may be placed so that it can be operated by the motorman without occupying the space of a passenger when not in use.

For purposes of illustration I have shown a particular construction embodying my invention and have described that construction in detail; but it is of course evident that the form, construction, and arrangement of the various parts may be varied without departing from the spirit of my invention, and I therefore do not wish to be limited to the construction shown.

In Fig. 4 I have shown a modification wherein the core projects from both ends of the solenoids and the magnetic circuit is completed by the engagement of both ends of said core with the piece of magnetic material.

The use and operation of my invention are as follows: When the car is stationary, each controlling-handle is in the central position shown in Fig. 3, the circuit through the controlling mechanism and the motors being thereby broken. If now it is desired to start the car, the controlling-handle is moved either to contact $H^8$ or $H^9$, depending upon the direction in which the car is to move. If, for example, the handle is moved to contact $H^9$, the circuit will be completed through the solenoid $H^5$ of the reversing device, and said reversing device will be operated by means of the core of the solenoid and the arm $H^2$, so that the circuits will be arranged to propel the car in one direction. If the handle is moved to contact $H^8$, the solenoid $H^4$ will be energized and the reversing device moved, so as to arrange the circuits for propelling the car in the opposite direction. The circuit in the latter instance will be as follows: from the trolley through the resistance I to the solenoid $H^4$, thence by conductor $H^7$ to contact $H^8$, and thence through the controlling-handle G to the ground. If now the controlling-handle is moved to contact E', the solenoid D, associated with the controller, is energized. This solenoid then draws its core C' inwardly, and since the part $A^2$ is of magnetic material the core will be attracted thereto. The movement of said core will therefore move said part and the controller a predetermined amount. The circuit when the parts are in this position is as follows: from the trolley through the resistance I to the solenoid D, thence by conductor E to contact E', and thence through the controlling-handle G to the ground. If now the controlling-handle is moved to contact F', the circuit through the solenoid D is broken, and the retracting-spring $C^2$ moves the core back to its initial position. At the same time the circuit through the solenoid C is completed, so as to draw its core inwardly. Since the part $A^2$ is in the magnetic circuit, the core will be attracted thereto, so as to move said part and controller a predetermined amount. The circuit when the parts are in this position will be as follows: from the trolley through the resistance I to the solenoid C, thence by conductor F to contact F', and thence through the controlling-handle G to the ground. If now the controlling-handle is moved back to the contact E', the circuit through solenoid C will be broken and the circuit through solenoid D be completed. The core of solenoid C will then be moved to its initial position by the retracting-spring, and a further movement of the part $A^2$ and the controller will be produced by the inward movement of the core of solenoid D. It will thus be seen that by working the controlling-handle G back and forth upon the contacts E' F' the solenoids C and D will be alternately energized and deënergized, so as to operate the controller by a step-by-step movement until the limit of its movement is reached. By means of this construction the controller will only be moved one step at each movement of the controlling-handle, and hence it will be seen that the rapid movement of the controller from its initial to its maximum position will be prevented and the evils attending such movement obviated. The contacts E' and F' are so arranged that the circuit through one solenoid is completed before the circuit through the other solenoid is broken, thus preventing the retracting-spring $A^3$ from acting. When the controller has been moved to its maximum position, the handle is allowed to remain at rest on one of the contacts E' or F'. When it is desired to stop the car, the controlling-handle G is moved to its initial position, thus breaking the circuit through both solenoids C and D. The retracting-spring $A^3$ then moves the controller to its initial position and breaks the circuit through the motors.

I claim—

1. A controlling device, comprising two electromagnetic devices each having a movable part adapted to be moved when the devices are energized, an opposed part of magnetic material movably mounted in proximity to said electromagnetic devices and connected with a circuit-varying device, said movable parts adapted to engage said opposed part and to magnetically attract the same when the electromagnetic devices are energized, and means for alternately energizing said electromagnetic devices so as to produce a movement of said opposed part.

2. A controlling device, comprising two electromagnetic devices each having a movable part adapted to be moved when the devices are energized, a circuit-varying device provided with an opposed part of magnetic material movably mounted in proximity to said electromagnetic devices and contained within the magnetic circuit of said devices, said movable parts adapted to engage said opposed part and to magnetically attract the same when the electromagnetic devices are energized, and means for alternately energizing said electromagnetic devices so as to produce a movement of said opposed part.

3. A controlling device, comprising a movable piece of magnetic material, two or more solenoids associated therewith and provided with movable parts adapted to engage said piece of magnetic material and to magnetically attract the same when the solenoids are energized, and means for alternately energizing said solenoids so as to produce a movement of said movable parts.

4. A controlling device, comprising a movable piece of magnetic material, one or more solenoids provided with movable cores each adapted to engage said piece of magnetic material and be attracted thereto when the solenoids are energized, the solenoids and cores arranged so that the piece of magnetic material is in the magnetic circuit thereof, a retracting device for said core or cores, and means for making and breaking the circuit through said solenoid or solenoids.

5. An attachment for electric-motor controllers, comprising a piece of magnetic material adapted to be connected with the movable part of said controller, two or more solenoids associated with said piece of magnetic material and each provided with a movable core adapted to engage the same and be attracted thereto when the solenoid is energized, a retracting device for the core of each of said solenoids, and means for alternately making and breaking the circuit through the solenoids.

6. An attachment for controllers for street-car motors, comprising a piece of magnetic material attached to the movable part of the controller, two or more solenoids provided with movable cores adapted to make contact with the periphery of said piece, said cores having their engaging parts movably connected with the remaining portions of the core, a controlling-handle conveniently located on the car and opposed to a series of contacts, suitable electrical connections between said contacts and said solenoids, whereby the circuit may be alternately made and broken so as to actuate the controller.

7. An attachment for controllers for street-car motors, comprising a piece of magnetic material attached to the movable part of the controller, two or more solenoids provided with movable cores adapted to make contact with the periphery of said piece, said cores having their engaging parts movably connected with the remaining portions of the core, a controlling-handle conveniently located on the car and opposed to a series of contacts, suitable electrical connections between said contacts and said solenoids, whereby the circuit may be alternately made and broken so as to actuate the controller, and a retracting device associated with said controller adapted to act to return it to its initial position when the controlling-handle is moved to a predetermined position.

8. A controlling device, comprising a movable piece of magnetic material, one or more solenoids associated therewith and provided each with a movable part adapted to engage said piece of magnetic material and to magnetically attract the same when the solenoid is energized, means for moving the movable part so as produce a movement of the piece of magnetic material, and an electrically-controlled reversing device for reversing the current through the motor.

9. An attachment for controllers for street-car motors, comprising a piece of magnetic material attached to the movable part of the controller, one or more solenoids provided with movable cores adapted to make contact with the periphery of said piece, said cores having their engaging parts movably connected with the remaining portions of the core, a controlling-handle conveniently located on the car and opposed to a series of contacts, suitable electrical connections between said contacts and said solenoids, whereby the circuit may be alternately made and broken so as to actuate the controller, and a reversing device provided with two solenoids connected therewith so as to move the reversing device in opposite directions, said solenoids electrically connected with contacts associated with said controlling-handle.

ADOLPH G. CARLSON.

Witnesses:
DONALD M. CARTER,
HOMER L. KRAFT.